Figure 1:
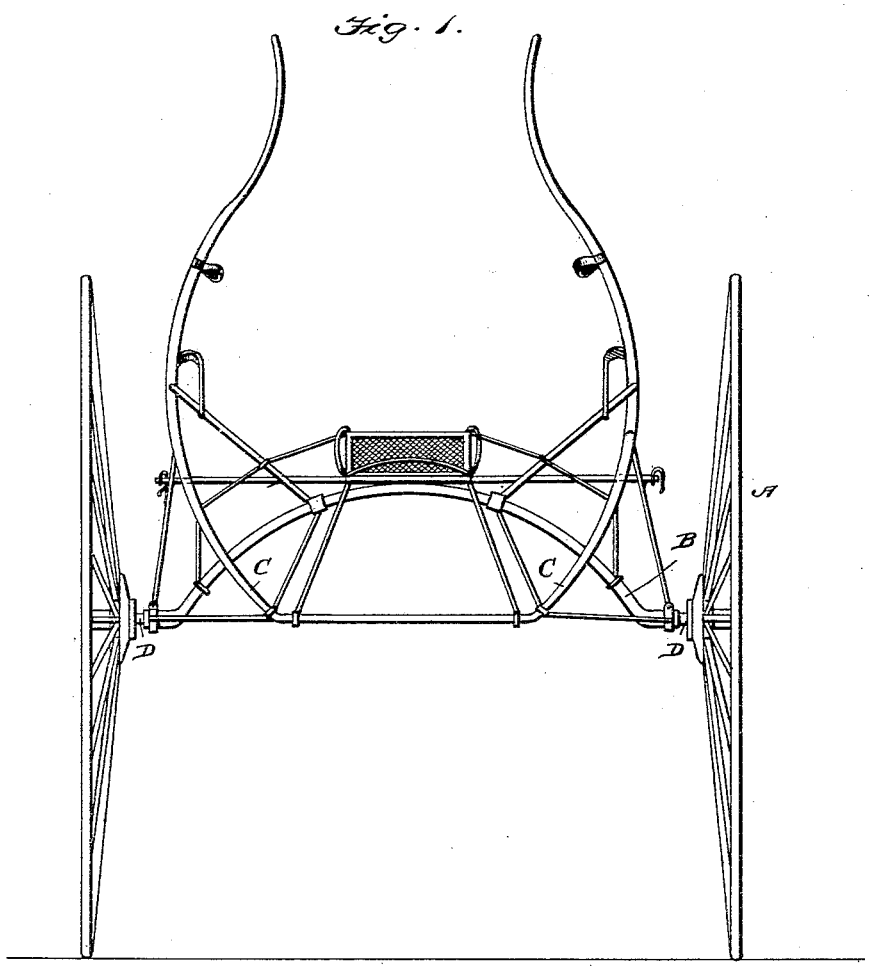

(No Model.)

W. A. FLEMING.
VEHICLE WHEEL.

No. 476,533. Patented June 7, 1892.

Witnesses:

Will A. Fleming.
Inventor
Attorney.

(No Model.) 2 Sheets—Sheet 2.

W. A. FLEMING.
VEHICLE WHEEL.

No. 476,533. Patented June 7, 1892.

Witnesses:
C. W. Dashiell
D. N. Naylor

Will A. Fleming
Inventor
By Wm. A. Moore
Attorney

UNITED STATES PATENT OFFICE.

WILL A. FLEMING, OF LEWISTON, IDAHO, ASSIGNOR OF ONE-HALF TO GEORGE W. MORRISON, OF SAME PLACE.

VEHICLE-WHEEL.

SPECIFICATION forming part of Letters Patent No. 476,533, dated June 7, 1892.

Application filed June 16, 1891. Serial No. 396,484. (No model.)

*To all whom it may concern:*

Be it known that I, WILL A. FLEMING, a citizen of the United States, residing at Lewiston, in the county of Nez Perces and State of Idaho, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in vehicle-wheels.

One object of the invention is to provide a wheel having its hub so constructed that its outer end will not project beyond the felly, whereby the said hub, and with it the spindle, will be protected from such injury as is caused by a collision between two vehicles.

A further object is to provide a hub having a spoke-seat arranged at each of its ends, whereby a greater number of spokes may be employed than with wheels of the ordinary construction, thus resulting in a strengthening of the felly and the prevention of the formation of flat places on the rim between the spokes.

A further object is to provide a hub having ball-bearings and means for adjusting the parts to take up lost motion.

A further object is to provide a vehicle-wheel having a series of vertical or main spokes, a series of inclined or brace spokes, and means for bracing the two sets of spokes to prevent vibration.

With these objects in view the invention consists in the various novel details of construction of a vehicle-wheel, as will be hereinafter fully described in the specification, illustrated in the drawings, and specifically pointed out in the claims.

Figure 2:
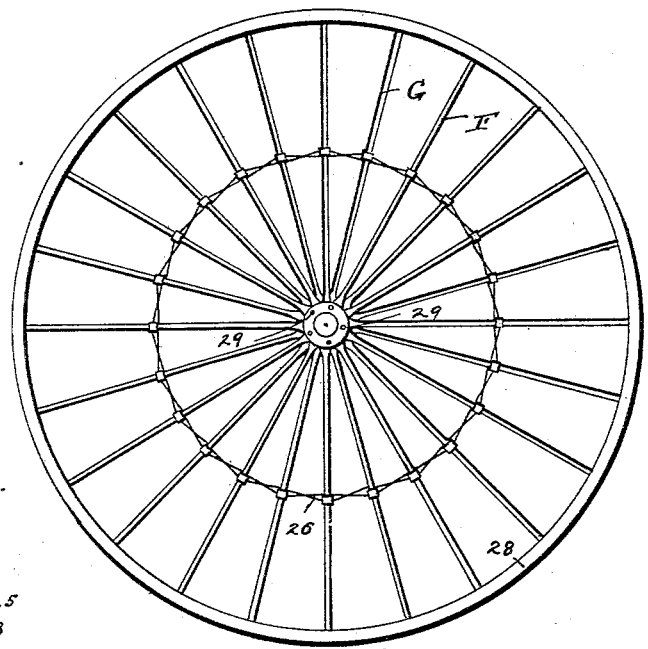
Figure 4:
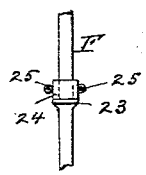
Figure 3:
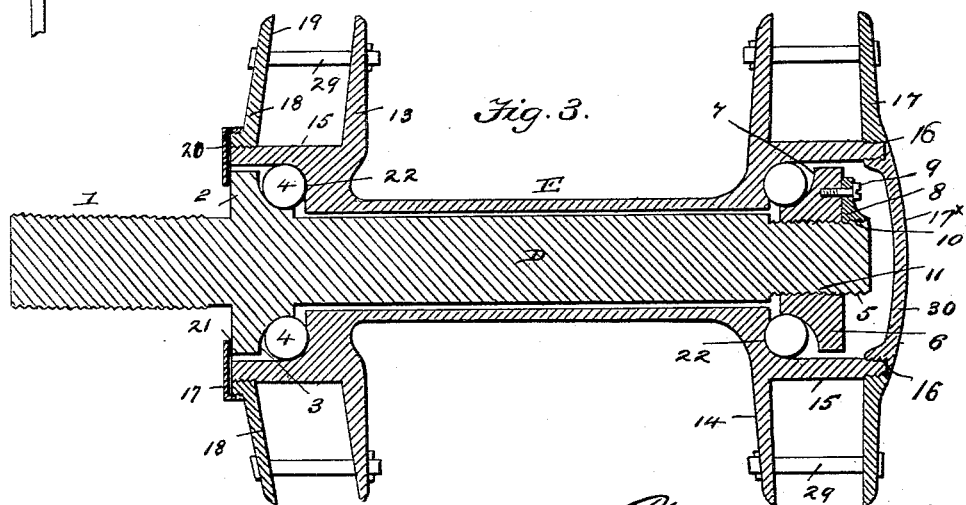

In the accompanying drawings, forming part of this specification, and in which like letters and numerals of reference indicate corresponding parts, Figure 1 is an end elevation of a sulky, showing my improved wheel in place thereon. Fig. 2 is an elevation of a wheel made in accordance with my invention. Fig. 3 is a vertical longitudinal sectional view taken on the line $x\,x$ of Fig. 2, showing the internal construction of my improved hub. Fig. 4 is an enlarged detail view of a portion of one of the spokes, showing the same provided with a shoulder and a collar resting thereon and carrying eyes, through which pass the wires for bracing the spokes.

Referring to the drawings, A designates the sulky, the axle B and thills C of which are stayed by means of suitable brace-rods. The outer ends of the axle are each provided with a threaded bore designed to be engaged by the threaded inner ends 1 of the spindles D, so as to admit of the wheels being readily removed when desired, and also to facilitate the replacing of a new spindle when necessary. The spindle is provided near its inner end with a collar 2, which may be either integral with or secured thereon, and on one side of the collar is formed an approximately-semicircular recess 3, which forms one of the bearing-surfaces of the balls 4. The outer end of the spindle is reduced and threaded, as at 5, and on the threaded portion fits a nut 6, having a bearing 7 similar to that in the collar 2. This nut carries a lock 8, which is held in place by means of a screw 9, and is provided on its inner face with serrations 10, adapted to engage similar serrations 11 on the outer end of the spindle, whereby the lock may be held securely in place when once adjusted, thus preventing any possible rotation of the nut.

E designates the hub, which is provided at each end with a flange numbered, respectively, 13 14, each of which forms one of the walls of one of the spoke-seats, and each flange carries a cup or socket 15, which form housings for the ball-bearings at each end of the hub. The outer ends of the sockets are threaded, as at 16, which threaded portions are engaged by clamping-plates 17 18 and the cap $17^\times$, the outer one 17 of which serves, among other purposes, to exclude the entrance of dust within the socket, and also prevents the escape of oil therefrom, and the cap $17^\times$ can be removed to adjust the bearings, while the inner plate 18 is more in the nature of a washer and forms, in conjunction with flange 13, the other wall 19 of the spoke-seat located at the inner end of the hub. In order to prevent the escape of oil and also to exclude the entrance from the rear ball-bearings, a cap 20 is provided, which is secured to the plate 18 and extends down a sufficient distance to cover the space between the collar 2 and the socket 15, a rubber jacket 21, carried by the cap and bearing against the rear end of collar 2, serving to form an air-tight, and therefore dust-proof, joint. Both the flanges 17 and 18 are provided with a semicircular recess 22, which, in connection with the recesses formed in the collar 2 and in the nut 6, form a bearing for the balls, that is approximately circular in cross-section.

F designates the main or vertical spokes, which are secured between the flange 14 and the clamping-plate 17, and G the inclined or brace spokes, which latter are caused to assume the position shown by reason of the fact that the flange 13 and the plate 18 are pitched toward the front end of the axle. The spokes are each provided with a shoulder 23, on which rests a ring or collar 24, carrying eyes 25, and through these eyes are passed wires 26 in such a manner as to cause them to cross between the spokes, as shown in Fig. 2, a tie or band 27, firmly secured to the wires at the point where they cross, serving to prevent vibration of the spokes. The spokes are set in the felly 28 in the usual manner. In securing the spokes in the hub the clamping-plates are screwed firmly against the said spokes, and by means of a suitable tool inserted between the serrations and a hammer the said plates may be forced against the spokes until they are firmly held. Bolts 29 are then inserted to clamp the plates and the flanges firmly together and also to prevent the former from working loose. When it is desired to oil the bearings, covers 30 are lifted, thus exposing the oil-holes, which covers serve to prevent the escape of oil and also to exclude dust from the bearings.

By constructing the hub in the manner described I effectually protect it from injury, and by means of the two spoke-seats I can employ twice the number of spokes usually employed, thus protecting the felly from injury. The brace-wires employed in connecting the spokes serve to make them rigid and also prevents undue vibration, and by making the spindle separate from the axle I can replace an old spindle with a new one at a cost far below that which would arise when the spindle and the axle are made integral.

Having thus fully described my invention, what I claim as new, and desire to secure by Letters Patent, is—

1. In a wheel, a hub having a spoke-seat at each end thereof, in combination with a series of spokes secured within the said seats, a collar carried by the spokes, and brace-wires connecting the collar of one spoke with that of another spoke.

2. In a wheel, the combination, with the hub having at each end a flange, each forming one wall of the spoke-sockets and carrying a socket or cup, the outer ends of the said sockets being screw-threaded, the cap and inner plate detachably engaging said threads and forming the complement of the spoke-sockets, the spindle having rounded seats and a collar, the balls seated therein, and the clamping-plate engaging the inner plate and bearing against the collar of the spindle, substantially as specified.

3. In a wheel, the combination, with the hub having at each end a flange, each forming one wall of the spoke-sockets and carrying a socket or cup, the outer ends of said sockets being screw-threaded and forming the complements of the spoke-sockets, the spindle having rounded seats and a collar, the balls therein, the clamping-plate engaging the inner plate and bearing against the collar of the spindle, the nut on the outer end of the spindle and having rounded seats, and the lock on the nut having screw-threaded engagement with the spindle, substantially as specified.

4. In a wheel, the combination of a spindle having flanges provided with bearings, a hub having bearings and sockets for vertical and inclined spokes, balls arranged in the bearings of the spindle and hub, vertical and inclined spokes fitting the sockets of the hub, a rim, and braces connecting the spokes 5. In a wheel, the combination of a spindle having threaded outer ends and flanges or collars formed with bearings, nuts secured to the threaded ends and formed with bearings, a hub having bearings, balls arranged in the bearings of the hub and spindle, caps detachably secured to the hubs and forming spoke-sockets, spokes in said sockets, and a rim.

In testimony whereof I affix my signature in presence of two witnesses.

WILL A. FLEMING.

Witnesses:
J. E. RICHARD,
J. M. HOWE.